United States Patent
Seaton et al.

[15] 3,665,462
[45] May 23, 1972

[54] ALARM SYSTEM

[72] Inventors: William Joe Seaton, Kearns; Arnold T. Pratt, Woods Cross, both of Utah

[73] Assignee: Garside Corporation, Salt Lake City, Utah

[22] Filed: Apr. 20, 1970

[21] Appl. No.: 29,977

[52] U.S. Cl. ............................................................343/5 PD
[51] Int. Cl. .................................................................G01s 9/02
[58] Field of Search..................................................343/5 PD

[56] References Cited

UNITED STATES PATENTS

| | | | |
|---|---|---|---|
| 3,237,191 | 2/1966 | Bojko | 343/5 PD |
| R25,100 | 12/1961 | Chapin | 343/5 PD UX |
| 3,210,752 | 10/1965 | Bojko | 343/5 PD UX |

*Primary Examiner*—T. H. Tubbesing
*Attorney*—Lynn G. Foster

[57] ABSTRACT

An alarm system the operation of which is controlled by a key switch and, if desired, by a seven-button decoder. Several abnormality detecting devices are connected to a computer dialer. The detecting devices may consist of a wide variety of sensors, three types of which are mentioned in this specification. Upon receipt of an alarm signal from a detecting device, some of the computer dialer circuitry interrogates that signal and, as a function of that signal, actuates the proper output circuitry of the computer dialer. The output circuitry specifically comprises a two-track tape playback and telephone dialing equipment for use with a commercial telephone system to deliver one or more prerecorded telephone warning messages to selected persons. The system cannot be jammed by incoming calls. An alarm device adapter for use with such equipment as cameras, tape recorders, lights, sirens or bells may also be provided.

4 Claims, 7 Drawing Figures

INVENTORS.
WILLIAM JOE SEATON
ARNOLD T. PRATT

ATTORNEY

PATENTED MAY 23 1972 3,665,462

INVENTORS.
WILLIAM JOE SEATON
ARNOLD T. PRATT

BY *Lynn L. Foster*

ATTORNEY

INVENTORS.
WILLIAM JOE SEATON
ARNOLD T. PRATT

BY
ATTORNEY

3,665,462

INVENTORS.
WILLIAM JOE SEATON
ARNOLD T. PRATT

BY

ATTORNEY

ALARM SYSTEM

BACKGROUND

1. Field of Invention

The present invention relates generally to alarm systems and more specifically to an alarm system comprising a computer dialer coupled with various sensors for detection of abnormal disturbances within a closed structure and capable of being programmed to dial one or more various telephone numbers and deliver an appropriate message to the predetermined destinations.

2. The Prior Art

The prior art burglar alarms of the radar type known to us have serious limitations. For example, the distance between the control unit and the radar sensor is limited because of the voltage drops encountered in long wires. Moreover, such prior art systems of the volume surveillance type make no provision for sorting relevant from irrelevant signals; therefore the alarm device is initiated by any signal, caused by movement, causing frequent "false alarms."

Also, proposals of the prior art do not compatibly match the alarm system with the equipment of a commercial telephone system for telephone reporting of abnormalities. Additionally, the integration of alarm circuitry and dialer circuitry into one unit thereby reducing the complexity of a given installation is not found in the prior art. Prior alarm systems are vulnerable in that they can be "tied up" by a would-be-burglar through outside dialing of the user's telephone number. Other disadvantages of the prior art exist.

BRIEF DESCRIPTION AND OBJECTS OF THE INVENTION

The present alarm system invention, including apparatus and methods, provides a novel system for detecting and reporting abnormalities within a closed vicinity. The detection of an abnormal disturbance, such as, but not limited to, a fire or burglary, by one or more of the various sensors within the closed vicinity causes an alarm signal to be developed. The alarm signal then actuates a control unit, which comprises a telephone dialer and which sends one or more prerecorded messages across conventional telephone lines to one or more interested persons.

It is a primary object of the present invention to provide a novel alarm system, including apparatus and methods.

Another important object of this invention is to provide novel telephone dialing equipment for use as part of an alarm system.

Another significant object of the present invention is to provide novel structure within an alarm system to clear incoming calls from a telephone system to which the alarm system is connected so that an alarm message may be transmitted to the desired designation without fail.

Another paramount object of the invention is to provide novel electrical structure to interrogate and discern between irrelevant and relevant signals, which are allowed to actuate alarm circuitry.

Another dominant object of this invention is the provision of novel sensing structure for an alarm system which surveys a predetermined volume.

These and other objects and features of the present invention will become more fully apparent from the following description and appended claims taken in conjunction with the accompanying drawings.

DETAILED DESCRIPTION OF THE ILLUSTRATED EMBODIMENT

Figure 1:
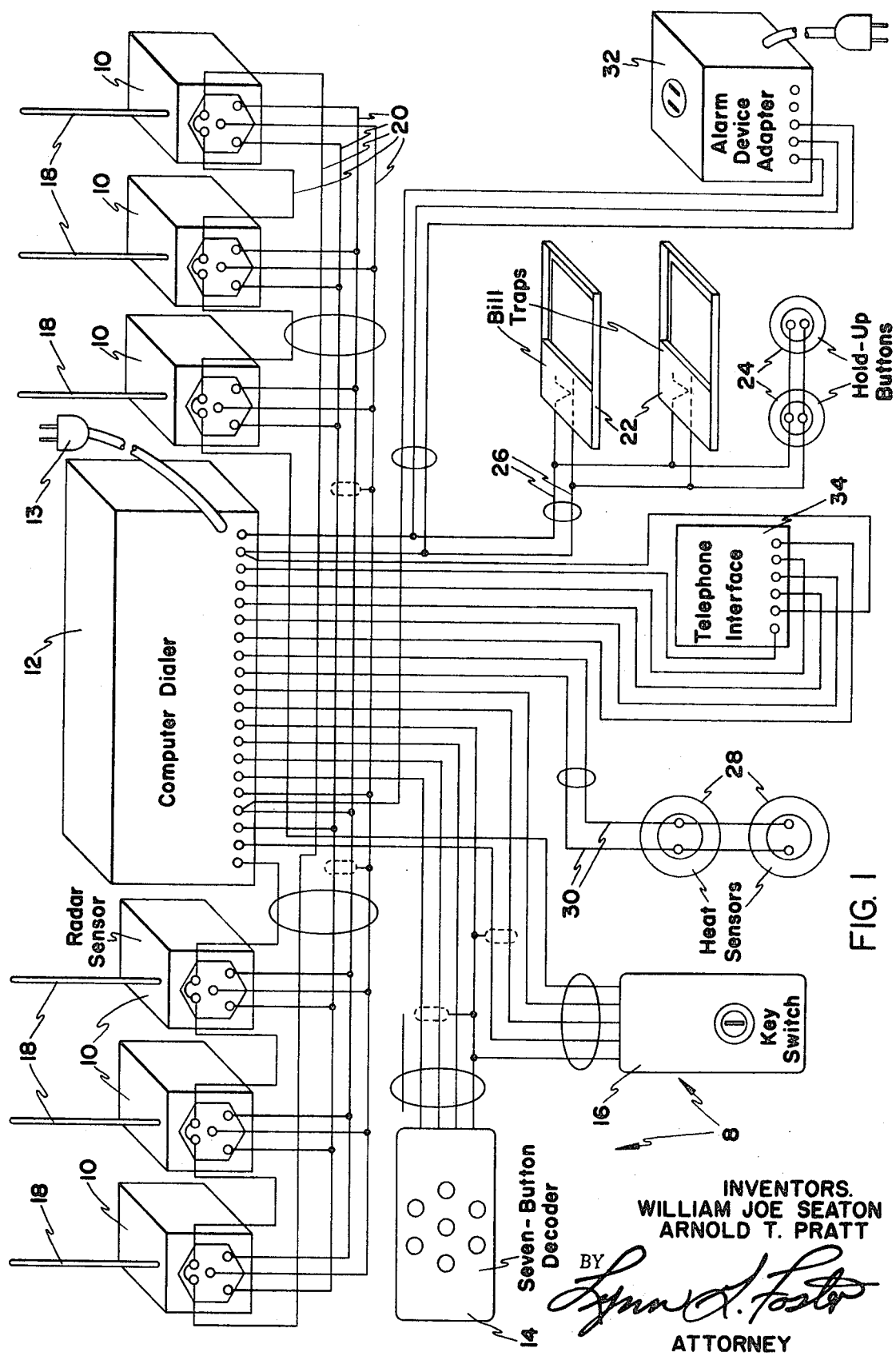
FIG. 1 is a pictorial wiring diagram of one alarm system according to the present invention.

General with specific reference to FIG. 1, one overall alarm system, according to the present invention and generally designated 8, is diagrammatically illustrated. The illustrated system 8 is capable of notifying one or more persons, such as the police, the fire department, the owner of a building, etc., that circumstances at a given location are abnormal. For example, a fire, a burglary and/or a robbery can be detected by this system; an alarm signal is generated by the abnormality and one or more appropriate telephone calls are made to inform responsible persons of the abnormality.

More specifically, in FIG. 1, a plurality of radar sensors 10 are electrically connected to a computer dialer 12. The computer dialer 12 is powered, preferably, by a household 110-voltage source through plug 13 and functions seriatim (a) to interpret warning signals received from any one of a plurality of diverse sensors, (b) to issue dialing pulses, which pulses are standardized for use with conventional telephone equipment by the telephone interface 34, and (c) to deliver the correct one of several possible pre-recorded telephone messages to one or more predetermined receivers. The computer dialer 12 is also powered by a battery source, as will hereinafter be more fully described.

The purpose of each radar sensor 10 is to detect any movement within an electro-magnetic field emanating from an antenna 18. If one radar sensor does detect movement within its controlled area, for example, a room in a building, an electric signal is sent from that radar sensor to the computer dialer through the interconnecting cable harness 20. Upon receipt of the signal from the radar sensor, the computer dialer is then free to function as programmed, provided the key switch 16 and the seven-button decoder 14 are in their respective active conditions.

The computer dialer is also adapted for connection to two other types of sensing devices, in addition to the burglary protection afforded by the radar sensors as mentioned above. First, bill traps 22 and hold-up buttons 24 are connected to the computer dialer by a cable harness 26. Specifically, each trap 22 can be located in the cashier's drawer at a bank, the switch of which is maintained normally open by the presence of a piece of paper currency. If the cashier removes the currency, the switch closes and the system 8 telephones the police. In like manner, either hold-up button can be manually closed, whereupon the police are telephoned automatically.

Heat sensors 28 are also connected to the computer dialer by a cable harness 30, each sensor 28 functioning to detect a sudden increase in temperature or a temperature condition which exceeds a predetermined temperature.

Figure 3:
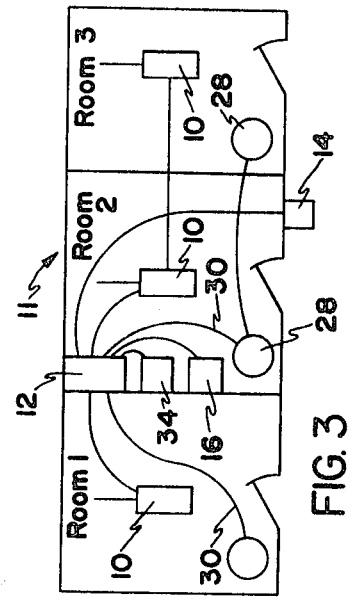
FIG. 3 is an example embodiment of a system installation in a three room building.
Figure 2:
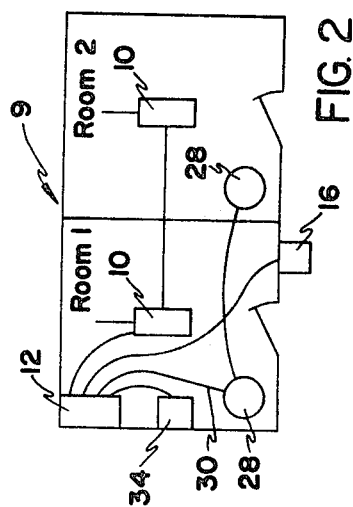
FIG. 2 is an example embodiment of a simple two room installation.

The system 8 also comprises an alarm device adapter 32, which may be plugged into a conventional 110-volt household outlet and functions under the control of the computer dialer. The adapter 32 provides power for auxiliary equipment, such as a television camera, a tape recorder, an alarm light, etc. FIGS. 2 and 3 respectively schematically illustrate in planned view two possible installations of alarm systems according to the present invention.

FIG. 2 illustrates a simplified system 9 with a radar sensor 10 and a heat sensor 28 in each of two rooms. The radar sensors and the heat sensors are respectively connected in series to computer dialer 12, which is located in Room 1 along with the telephone interface 34. The system 9 does not comprise a seven-button decoder, a bill trap 22, a hold-up button 24 nor an adapter 32. The key switch 16 is located external of the building comprising Rooms 1 and 2 and may be activated and deactivated by a person outside the building.

The system 11 of FIG. 3 illustrates three rooms, each having a radar sensor 10 and a fire sensor 28 disposed therein. A computer dialer 12, a telephone interface 34 and a key switch 16 are located within the central Room 2 with the radar sensors 10 to the right and the radar sensors 10 to the left, respectively connected in parallel to the computer dialer 12. In like manner, the fire sensors 28 to the right and the fire sensors to the left (not shown) are respectively connected in parallel to the computer dialer 12. In addition, a seven-button decoder 14 is located external of the building and can be actuated to temporarily deactivate the system 11, allowing a person to enter the building and permanently deactivate the system 11 by turning the key switch 16 to its "off" position.

Radar Sensor

General

Figure 4:
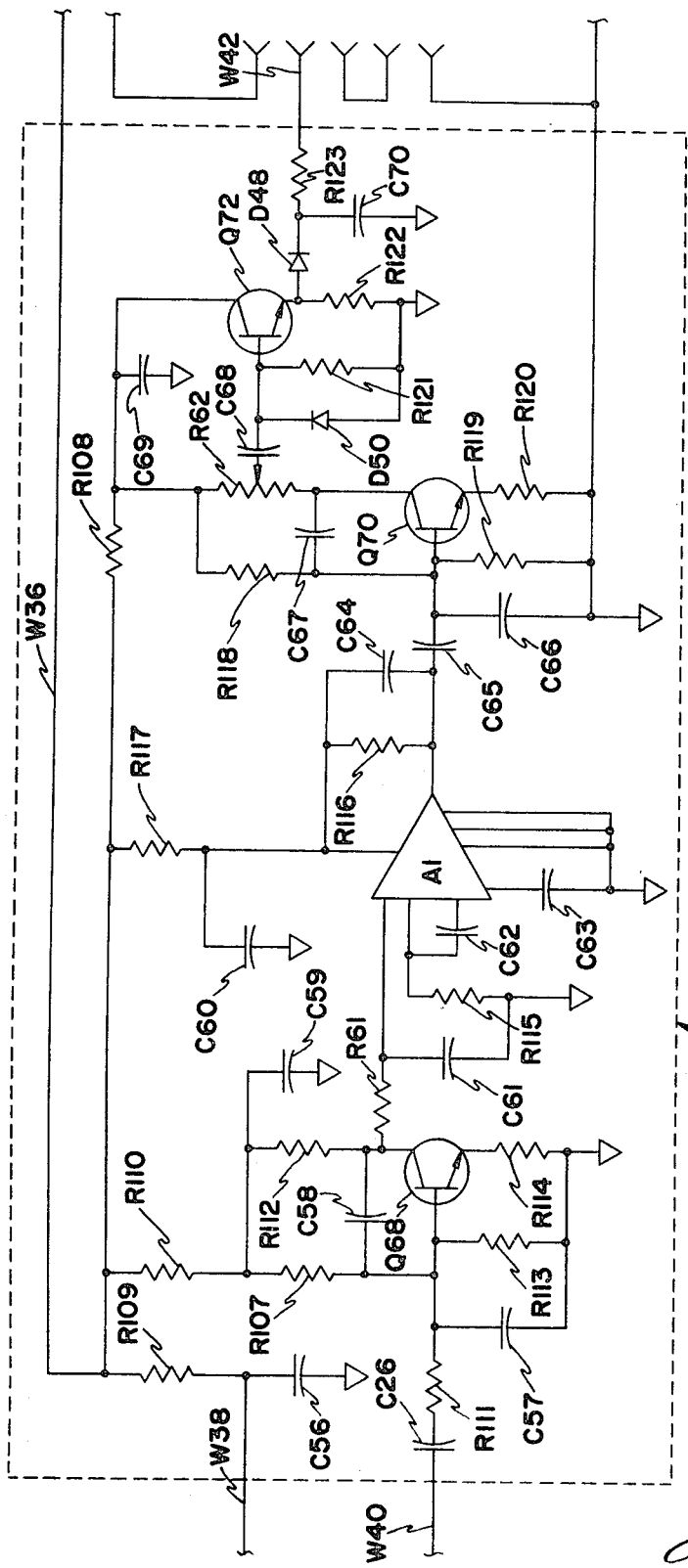
FIG. 4 is a schematic diagram of the voltage amplifier of a radar sensor.
Figure 7:
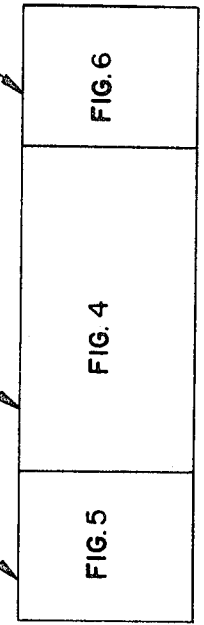
FIG. 7 illustrates the relationship of the circuits of FIGS. 4, 5 and 6.
Figure 6:
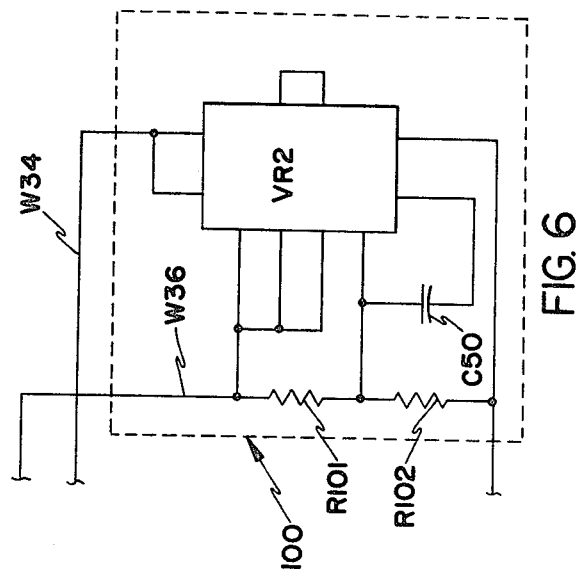
FIG. 6 is a schematic diagram of the voltage regulator for the radar sensor.
Figure 5:
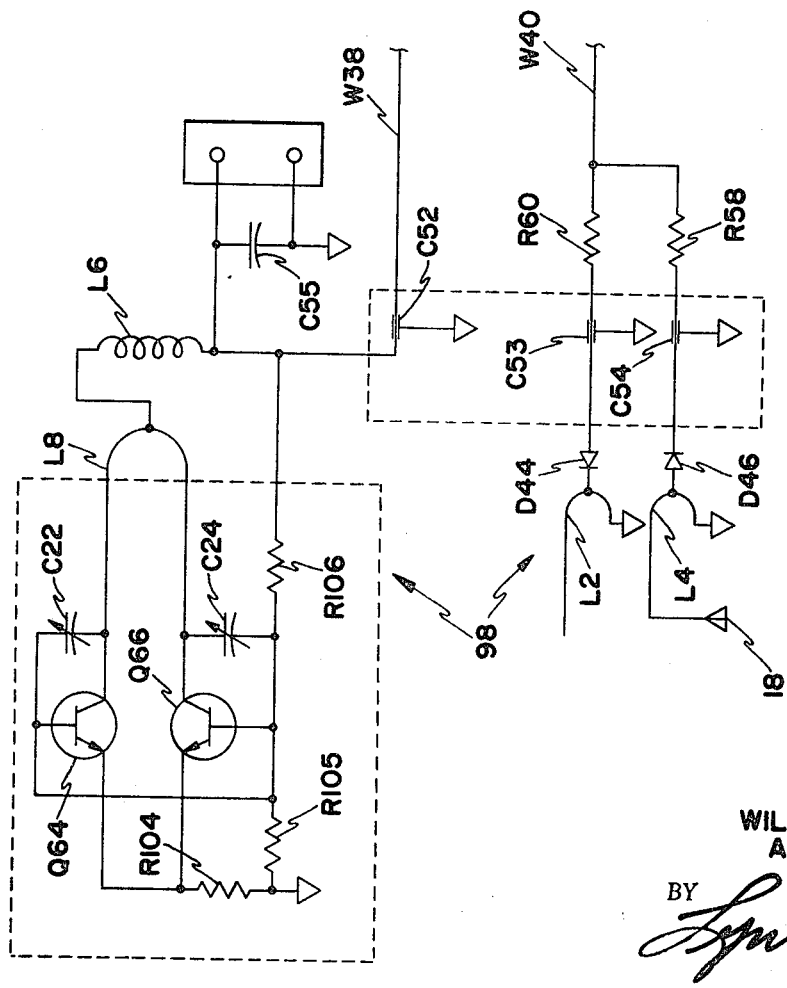
FIG. 5 is a schematic diagram of the oscillator circuitry of the radar sensor.

The presently preferred embodiment of each radar sensor 10 is composed of three separate circuits. One circuit, shown in FIG. 4, is a voltage amplification circuit, generally designated 96. The remaining two circuits are shown in FIGS. 5 and 6. FIG. 5 illustrates oscillator circuit 98, while FIG. 6 illustrates voltage regulator circuit 100. The broad relationship of the circuits 96, 98 and 100 is shown in FIG. 7.

Power is supplied for the operation of each radar sensor 10 from the computer dialer 12 by part of cable 20, shown in FIG. 1. The power is first delivered to the voltage regulator VR2 of FIG. 6. After regulation, the power is applied to the oscillator circuitry of FIG. 5 which produces an electro-magnetic field of near 400 megacycles. Some of the electro-magnetic energy produced is inductively coupled to two parasitic antenna coils L2 and L4, also of FIG. 5. The just previously mentioned coils are used to produce a voltage fluctuation which is amplified by the circuitry of FIG. 4. The resulting amplified signal is fed back through cable 20 to the computer dialer 12.

Voltage Regulator Circuit

The voltage regulator circuit 100, shown in FIG. 6, is composed of an integrated circuit VR2, two resistors R101 and R102, and a capacitor C50. Wire W34 supplies input power from the computer dialer to VR2. VR2 accurately regulates an output voltage, which is supplied through circuit 96 to the oscillator circuit 98 via wires W36 and W38.

Oscillator Circuit

The mentioned voltage supplied through wire W38 is applied to the oscillator circuit 98 of FIG. 5. Wire W38 connects the voltage to tuned coil L8 of the oscillator through an RF blocking coil L6. As the positive input voltage is applied to the middle of coil L8, either transistor Q64 or transistor Q66 begins to conduct current through its collector and emitter. As the one transistor starts to conduct, the capacitor associated with the other transistor begins to charge. For example, if transistor Q66 starts to conduct, capacitor C22 begins to charge. After a short period of time, transistor Q66 will cease its conduction and transistor Q64 will begin to conduct. While transistor Q64 is conducting, capacitor C22 is discharging and capacitor C24 is charging. Because of the values of capacitances, inductances, and resistances encountered in the oscillator circuit 98, a specific frequency of oscillation will exit, when the circuit is powered.

Some of the oscillation energy developed in the coil L8 during operation is inductively coupled to two parasitic coils L2 and L4. Coil L2 is completely enclosed within the housing of the radar sensor 10; however, coil L4 is not completely enclosed since it has an extending antenna 18. As a result, coil L2 has an environment which is completely controlled by the field of coil L8 and outside factors, such as movement of human beings and the like, have no affect on coil L2. Coil L4, on the other hand, is affected by such movements. The pertinent result is that the electrical properties of coil L4 change as the radiation properties of the environment immediately external of the antenna 18 of coil L4 change.

It is commonly known that external factors have a great affect upon radiation impedances of all antennas. For example, ground plane wires constructed the base of a large variety of antennas have an affect upon the input impedance of the antenna itself. Thus, the conditions outside an antenna affect the electrical properties of the antenna just as if the physical properties of the antenna were varied.

During operation of the 400-megacycle oscillator 98, parasitic coils L2 and L4 carry induced node voltages at the connection points with the diodes D44 and D46, respectively. As a result of the arrangement of the diodes, a conventional current is allowed to flow from the diode junction node of coil L4 through diode D46, resistor R58, resistor R60, diode D44, coil L2, the ground of coil L2, the ground of coil L4 and back to the diode junction node of coil L4.

When the radiation impedance of the antenna 18 and coil L4 is non-variant, the voltage sensed at the wire joining resistors R60 and R58 is also non-variant. If, however, the external properties surrounding antenna 18 are varied, the radiation impedance properties of the antenna 18 and coil L4 are also varied. As the impedance of coil L4 is varied, the total impedance of the just previously described current path is also varied.

If the impedance of the described current path is varied and the power being delivered is constant, the current through the total current path must also vary by the vector equation $$P = I^2 Z,$$

where $P$ is power, $I$ is current and $Z$ is impedance. If the current is so varied, the voltage at the connection between resistors R58 and R60 also varies. This described voltage variation is transmitted by wire W40 to the voltage amplifier 96 of FIG. 11.

Resistors R104, R105 and R106 are biasing resistors for the transistors of the oscillator circuit 98. The capacitor C55 filters the input voltage to circuit 98. Capacitors C52, C53 and C54 feed various input or output signals into or out of the chamber of oscillator circuit 98.

Voltage Amplifier

The voltage amplifier 96 will be explained with specific reference to FIG. 4. The input signal of the voltage amplifier 96 is supplied by wire W40 to the base of transistor Q68, across the DC voltage blocking capacitor C26. The signal supplied to the transistor Q68 is non-polarized and, thus, biases transistor Q68 both positively and negatively from the quiescent point (Q-point). The amplified voltage variation is then transmitted from the collector of Q68 via resistor R61 to the integrated circuit amplifier A1. After the signal has been amplified by the integrated circuit A1, it is then transferred to the base of transistor Q70 for further amplification.

Potentiometer R62 is connected in the collector circuit of transistor Q70 and the output voltage from the collector of Q70 is tapped from resistor R62 by the slider of the potentiometer. This tapped voltage is again amplified by transistor Q72. The signal from the emitter of transistor Q72 becomes the output of the voltage amplifier circuit 96 upon passage through diode D48. As a result of the polarization of diode D48, only positive signal elements are transmitted from the radar sensor to the sensor detector network 38 via wire W42 (which comprises part of cable 20 of FIG. 1).

Additional components required for the operation of the voltage amplifier circuit 96 will now be described. Resistors R108, R109, R110 and R112 are individually used to provide loads for various components of circuit 96. Biasing resistors R107, R113, R118, R119 and R121 plus the emitter stabilizing resistors R114, R120 and R122 are used in sets to control the Q-point of various ones of the circuit transistors. Resistors R111 and R123 assist capacitors C57 and C70 in stabilizing the input and output signals, respectively.

Capacitors C56, C59 and C69 perform filtering functions for different positive voltage supply points throughout circuit 96. Capacitors C58 and C67 are feed back capacitors for transistors Q68 and Q70, respectively. Capacitors C65 and C68 are coupling capacitors for different stages, while capacitor C66 is a stabilizing capacitor for the input signal of transistor Q70.

Resistors R115, R116 and R117 together with capacitors C60, C61, C62, C63 and C64 are necessary for the control of the circuit parameters surrounding the integrated circuit A1.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A radar sensor adapted to comprise part of an alarm system for detection of movement in a monitored volume of space, the radar sensor comprising external antenna means, oscillator means for producing high frequency electro-magnetic radiation, shielded comparison parasitic antenna means, and means for connecting the radar sensor to a source of electrical power, the radar sensor further comprising voltage amplification means electrically connected to tap means at the external antenna means and to tap means at the comparison parasitic antenna means, the voltage amplification means sensing and amplifying variations in the difference voltage between the external antenna means and the comparison parasitic antenna means.

2. A radar sensor as defined in claim 1 wherein the voltage amplification means are closely juxtaposed and joined to both antenna means for transmitting the differential signal voltage from the antenna means to the voltage amplification means without inducing stray voltages or incurring large voltage drops.

3. A radar sensor as defined in claim 1 further comprising voltage regulation circuitry connected to the voltage amplification means and to the oscillator means for supplying both with well regulated voltage to develop a strong amplified output which is not materially influenced by spuriously induced signals, whereby false alarms are alleviated.

4. In a method of generating radar-derived signals at a remote sensing location, the steps of: issuing electro-magnetic radiation within a monitored region from an external antenna at the sensing location, the impedance of radiation being varied by movement within the region; establishing a reference radiation in a controlled environment; comparing at the sensing location any variation at which the radiation is issued from the external antenna to the reference radiation; generating at the sensing location a time-variant difference signal which corresponds to variations in issuance of radiation from the external antenna caused by movement within the region; amplifying the difference signal at the sensing location to render induced stray and spurious signals insignificant by comparison; transmitting the amplified signal to remote alarm circuitry.

* * * * *